United States Patent
Emrich et al.

(10) Patent No.: US 10,611,485 B2
(45) Date of Patent: Apr. 7, 2020

(54) SEAT ASSEMBLY USING J-TRACK SEATS

(71) Applicant: Bell Helicopter Textron Inc., Fort Worth, TX (US)

(72) Inventors: Joshua Andrew Emrich, Grapevine, TX (US); Guillaume Noiseux Boucher, Mirabel (CA)

(73) Assignee: BELL HELICOPTER TEXTRON, INC., Fort Worth, TX (US)

( * ) Notice: Subject to any disclaimer, the term of this patent is extended or adjusted under 35 U.S.C. 154(b) by 365 days.

(21) Appl. No.: 15/484,724

(22) Filed: Apr. 11, 2017

(65) Prior Publication Data

US 2018/0290751 A1    Oct. 11, 2018

(51) Int. Cl.
| | | |
|---|---|---|
| *B64D 11/06* | (2006.01) | |
| *B64C 27/00* | (2006.01) | |
| *B60N 2/015* | (2006.01) | |
| *B60N 2/14* | (2006.01) | |
| *B64C 27/04* | (2006.01) | |
| *B64C 29/00* | (2006.01) | |

(52) U.S. Cl.
CPC ........ *B64D 11/064* (2014.12); *B60N 2/01525* (2013.01); *B60N 2/14* (2013.01); *B64C 27/00* (2013.01); *B64D 11/0689* (2013.01); *B64D 11/0696* (2013.01); *B64C 27/04* (2013.01); *B64C 29/0033* (2013.01)

(58) Field of Classification Search
CPC ............ B64D 11/0689; B64D 11/0696; B64D 11/064; B60N 2/0737; B60N 2/0742; B60N 2/0745
USPC ....................................... 297/344.24, 344.21
See application file for complete search history.

(56) References Cited

U.S. PATENT DOCUMENTS

| | | | | |
|---|---|---|---|---|
| 2,563,220 A | * | 8/1951 | Doty ...................... | B60N 2/146 297/344.26 |
| 6,027,170 A | * | 2/2000 | Benz ........................ | B60N 2/14 248/425 |
| 6,794,013 B1 | * | 9/2004 | Iacovelli ................ | B60N 3/044 15/215 |
| 6,981,746 B2 | * | 1/2006 | Chung ..................... | A47C 3/18 248/425 |
| 8,857,763 B2 | | 10/2014 | Brand et al. | |

(Continued)

FOREIGN PATENT DOCUMENTS

JP    59014578 A  *  1/1984 ............. B60N 2/015

*Primary Examiner* — Philip J Bonzell
*Assistant Examiner* — Tye William Abell
(74) *Attorney, Agent, or Firm* — Edwin S. Flores; Daniel J. Chalker; Chalker Flores, LLP (57) ABSTRACT

The present invention includes a movable seat assembly for a vehicle, comprising: first and second predetermined paths located on the floor of the vehicle, each path having an operational location at a first end and an ingress/egress location at a second end, the paths having a substantially straight portion and a curved portion; a seat slidably connected to the paths and capable of translation between the first and the second position; two or more openings on the floor of the vehicle on or about the first and second predetermined paths that provide a locking position for the seat, wherein the two or more opening are connected via a conduit below the surface of the floor; and at least one locking pin/plunger connected to the seat and capable of engaging the two or more openings to lock the seat in place along the first and second predetermined paths.

23 Claims, 8 Drawing Sheets

(56) References Cited

U.S. PATENT DOCUMENTS

| | | |
|---|---|---|
| 9,248,759 B2 | 2/2016 | Brand et al. |
| 2011/0062286 A1* | 3/2011 | Pinkal ................ B64D 11/0696 244/122 R |
| 2013/0193732 A1* | 8/2013 | Brand ...................... B60N 2/14 297/344.21 |

* cited by examiner

SEAT ASSEMBLY USING J-TRACK SEATS

CROSS-REFERENCE TO RELATED APPLICATIONS

Not applicable.

TECHNICAL FIELD OF THE INVENTION

The present invention relates in general to the field of aircraft design, and more particularly, to a seat assembly using J-track seats.

STATEMENT OF FEDERALLY FUNDED RESEARCH

Not applicable.

BACKGROUND OF THE INVENTION

Without limiting the scope of the invention, its background is described in connection with aircraft.

Two such examples are taught in U.S. Pat. Nos. 8,857,763 and 9,248,759, issued to Brand, et al., entitled "Vehicle crew station seat assembly", and assigned to Bell Helicopter Textron Inc. Briefly, these inventors teach a movable seat assembly for a vehicle comprises a predetermined path having an operational location at a first end and an ingress/egress location at a second end, and a seat that travels along the predetermined path between the operational location and the ingress/egress location, wherein the seat has an operational orientation at the operational location and an ingress/egress seat orientation at the ingress/egress location; the ingress/egress seat orientation being substantially angled relative to the operational seat orientation. Another moveable seat assembly for a vehicle comprises a predetermined path having an operational location at a first end, an ingress/egress location at a second end, and a standby location along the path there between; and a seat that travels along the predetermined path between the operational location, the standby location, and the ingress/egress location; wherein the position of the seat is adjustable at the operational location.

SUMMARY OF THE INVENTION

In one embodiment, the present invention includes a moveable seat assembly for a vehicle, comprising: first and second predetermined paths located on a floor of the vehicle, each path having an operational location at a first end and an ingress/egress location at a second end, the first and second predetermined paths having a substantially straight portion and a curved portion; a seat slidably connected to the first and second predetermined paths and capable of translation between the first and second end; two or more openings on the floor of the vehicle on or about the first and second predetermined paths that provide a locking position for the seat, wherein the two or more openings are connected via a conduit below a surface of the floor; and at least one locking pin/plunger connected to the seat and capable of engaging the two or more openings to lock the seat in place at the first end. In one aspect, the seat is coupled to the first and second predetermined paths by a plurality of couplers, free orientation type couplers, or limited rotation type couplers. In another aspect, the locking pin/plunger is selectively operated by a handle connected to the locking pin/plunger, wherein the handle is located below the seat, adjacent the seat, above the seat, on a side of the seat or a seat back, on arm rests of the seat, or behind the seat. In another aspect, the moveable seat assembly further comprises a travel assistance mechanism to assist in translating the seat between the operational location and the ingress/egress location. In another aspect, the locking pin/plunger is selected from the group consisting of: a mechanical mechanism, a spring-type mechanism, an electric mechanism, a hydraulic mechanism, a pneumatic mechanism, a magnetic mechanism, an electro-hydraulic mechanism, an electro-pneumatic mechanism, or an electro-magnetic mechanism. In another aspect, the moveable seat assembly further comprises a positive catch is positioned to releasably restrain the seat at the ingress/egress location. In another aspect, the moveable seat assembly further comprises two or more glides or wear plates that support at least part of a weight of the seat to reduce wear on the first and second predetermined paths and/or that add stability to the seats while traveling along the predetermined path. In another aspect, the moveable seat assembly further comprises one or more bumpers or catches attached to the floor that at least one of: prevent derailment of the seat on the first and second predetermined first and second predetermined paths at the transition between the substantially straight portion and a curved portion, or an ingress/egress striker catch that stabilizes the seat at the ingress/egress location. In another aspect, the moveable seat assembly further comprises a scuff plate that extends around at least one edge of the floor adjacent the seat to prevent damage to the floor during operation of the vehicle or during ingress/egress form the seat. In another aspect, the conduit is removable. In another aspect, the locking pin/plunger further comprises indicia that show if the locking pin/plunger is in a locked or an unlocked position. In another aspect, the locking pin/plunger is spring-loaded, and the locking pin/plunger may be operated with a Bowden cable or push-pull-rod.

In another embodiment, the present invention includes a rotorcraft comprising a moveable seat assembly comprising: an operator cabin having a floor; and a mounting plate for a seat comprising: first and second predetermined paths located on the floor of the rotorcraft, each path having an operational location at a first end and an ingress/egress location at a second end, the first and second predetermined paths having a substantially straight portion and a curved portion; the seat slidably connected to the first and second predetermined paths and capable of translation between the first and second position; two or more openings on the floor of the rotorcraft on or about the first and second predetermined paths that provide a locking position for the seat, wherein the two or more opening are connected via a conduit below the surface of the floor; and at least one locking pin/plunger connected to the seat and capable of engaging the two or more openings to lock the seat in place along the first and second predetermined paths. In one aspect, the locking pin/plunger may be selectively operated by a handle connected to the locking pin/plunger, wherein the handle is located below the seat, a location adjacent the seat, a location above the seat, a location on a side of the seat or a seat back, on arm rests of the seat, or a location behind each seat. In another aspect, the moveable seat assembly further comprises a travel assistance mechanism to assist in translating the seat between the operational location and the ingress/egress location. In another aspect, the locking pin/plunger is selected from the group consisting of: a mechanical mechanism, a spring-type mechanism, an electric mechanism, a hydraulic mechanism, a pneumatic mechanism, a magnetic mechanism, an electro-hydraulic mechanism, an electro-pneumatic mechanism, or an electro-magnetic mechanism. In another aspect, the moveable seat assembly further comprises a positive catch is positioned to releasably restrain the seat at the ingress/egress location. In another aspect, the moveable seat assembly further comprises two or more glides or wear plates that support at least part of a weight of the seat to reduce wear on the first and second predetermined paths. In another aspect, the moveable seat assembly further comprises one or more bumpers or catches attached to the floor that at least one of: prevent derailment of the seat on the first and second predetermined paths at a transition between the substantially straight portion and a curved portion, or an ingress/egress striker catch that stabilizes the seat at the ingress/egress location. In another aspect, the moveable seat assembly further comprises a scuff plate that extends around at least one edge of the floor adjacent the seat to prevent damage to the floor during operation of the rotorcraft or during ingress/egress form the seat. In another aspect, the conduit is removable. In another aspect, the locking pin/plunger further comprises indicia that shows if the locking pin/plunger is in a locked or an unlocked position, wherein the locking pin/plunger. In another aspect, the locking pin/plunger is spring-loaded, and the locking pin/plunger may be operated with a Bowden cable or push-pull-rod.

In another embodiment, the present invention includes a kit for a moveable seat assembly for a vehicle, comprising: a mounting plate for a seat comprising: first and second predetermined paths located on the floor of the vehicle, each path having an operational location at a first end and an ingress/egress location at a second end, the first and second predetermined paths having a substantially straight portion and a curved portion; two or more openings on the floor of the vehicle on or about the first and second predetermined paths that provide a locking position for the seat, wherein the two or more opening are connected via a conduit below the surface of the floor; and instructions for installation of the seat assembly.

In another embodiment, the present invention includes a method of providing an improved moveable seat assembly, comprising: providing first and second predetermined paths located on the floor of the vehicle, each path having an operational location at a first end and an ingress/egress location at a second end, the first and second predetermined paths having a substantially straight portion and a curved portion; attaching a seat slidably to the first and second predetermined paths and capable of translation between the first and second position; providing two or more openings on the floor of the vehicle on or about the first and second predetermined paths that provide a locking position for the seat, wherein the two or more opening are connected via a conduit below the surface of the floor; and providing at least one locking pin/plunger connected to the seat and capable of engaging the two or more openings to lock the seat in place along the paths.

BRIEF DESCRIPTION OF THE DRAWINGS

The novel features believed characteristic of the present application are set forth in the appended claims. However, the system itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

DETAILED DESCRIPTION OF THE INVENTION

While the system of the present application is susceptible to various modifications and alternative forms, specific embodiments thereof have been shown by way of example in the drawings and are herein described in detail. It should be understood, however, that the description herein of specific embodiments is not intended to limit the present application to the particular forms disclosed, but on the contrary, the intention is to cover all modifications, equivalents, and alternatives falling within the spirit and scope of the present application as defined by the appended claims.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Illustrative embodiments of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

As used herein, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Tooling for doors is expensive and with additional doors maintenance of seals and other parts is required. Combining the crew and passenger doors into one or more doors necessitated a way to allow the pilot and co-pilot to have seats that allow them to exit the aircraft without having to climb over their own seat. The invention of the J-Track, as taught in U.S. Pat. Nos. 8,857,763 and 9,248,759, allowed the pilot and co-pilot to egress the aircraft by sliding back and inboard and easily exit their seat. No aircraft seat slides back and inboard with the express intent to allow easy ingress and egress from the crew seats.

Vehicle crew station layouts vary considerably. Most comprise an arrangement of seats, vehicle controls, instruments, control panels, displays, and associated structure. Features are generally arranged in front of, beside, and/or above an operator in order to be substantially accessible during vehicle operation. Flight controls are situated in front of, and next to, a rotorcraft operator seated in an operational location, these flight controls include, e.g., a cyclic stick, collective lever, engine throttle, and yaw pedals, along with several instruments and displays. Overhead control panels and center consoles are also within reach and in general alignment with an operator's operational position and orientation. Other systems are likewise positioned proximate to an operator onboard certain types of vehicles, e.g., weapons systems, radar controls, electronic jamming equipment, etc.

Intuitive and efficient arrangement of these systems around an operator is desirable for safe and comfortable operation, and efficient vehicle design. These features may be arranged into a tight, integrated package encompassing an operational location designed to minimize operator movement, attention diversion, and unnecessary vehicle weight and profile. However, ingress and egress considerations may substantially limit efficient arrangement of these systems in order to provide pathways for an operator, technician, or any other person (hereinafter "crew member" collectively) to enter and exit a seat in a crew station. Common crew station access points include a side door, a center aft door or passage, and/or a side aft door or passage, depending on the type of vehicle and its particular architecture. In side door applications, crew members often enter a seat in the crew station by sliding in sideways to a seat substantially fixedly oriented toward the fore end of the vehicle. In aft door or passage applications, crew members may ingress into the crew station from the rear through the vehicle cabin, and negotiate a narrow passageway running alongside a seat in order to sit down. Both approaches involve a passageway next to, and sometimes substantially around, the front quarter of a seat, which a crew member uses to ingress and egress a crew station and sit in an operational position. Providing such a pathway can result in crew station layouts that are uncomfortable and/or unnatural for crew member ingress/egress and operation, in addition to increasing vehicle weight and aerodynamic profile. In many cases, crew members intentionally or inadvertently step over, step on, kick, lean on, or otherwise make contact with instruments, controls, or other devices when ingressing and egressing a crew station, which can damage these systems. Such damage may lead to reduced dispatch reliability and increased in repair costs. Additionally, some crew station layouts make it difficult for crew members to ingress and egress without disturbing or invading the personal zone of others seated nearby, or without requiring others to move or completely disembark the vehicle altogether.

The present invention is directed to an improved seat assembly having a J-track that is activated by a lever attached to the seat. A lever is attached to cables that operate plungers that lock the seat base in place during normal flight. When the lever is pulled the plungers come up and un-lock the seat base and allow it to travel backwards and in-board. The seat base travels on, e.g., four (4) adjustable roller bearings to allow the seat to smoothly glide upon the track and/or add stability to the seats while traveling along the predetermined path. The roller bearings travel on wear strips that prevent the roller bearings from causing damage to the understructure. Once the seat base is un-locked, the seat base's, e.g., four (4) devises are allowed to disengage the, e.g., four (4) floor pucks used to hold down the seat base to the aircraft structure. Once the seat is at the far back position, it is then allowed to rotate about a bearing attached to the floor structure on the inboard side of the seat base. The seat then completes the "J" motion into a catch that prevents the seat base from rocking when in the aft most position. A conduit or tube connecting both the floor holes together prevents foreign-object-debris (FOD) from coming into the floor substructure below the seat base and the plunger locations, which conduit or tube can be optionally removable. Bumpstops on the side of the seat base help align the seat base when returning to the locked position. The pins or plungers can include a visual indicia or marker that shows the person who sits in the seat when the mechanism is locked or un-locked, which pins or plungers can be connected to a lever. When the seat returns to the locked position, the lever returns to the down position. The plungers can be spring loaded to ensure full engagement of the plunger in the locked position.

The present invention can be used in any craft, including aircraft such as rotorcraft (e.g., helicopter or vertical take off and landing aircraft) that have been designed to not include specialized or specific pilot and co-pilot doors in a front portion of the rotorcraft. The J-track seat assembly of the present invention allows the pilot and co-pilot to quickly and easily exit the rotorcraft by exiting a single door in the mid-section or portion of the rotorcraft. The seat travels backwards and in-board such that the pilot and co-pilot can exit a door or doors in the midsection or rear of the craft. The present invention can also be provided as a kit to retrofit existing rotorcraft.

The design of the present invention has certain distinct advantages over existing seat assemblies. These advantages include, but are not limited to, a smoother transition from flight mode to egress mode; a positive catch in the egress position to protect roller and rails against excessive wear; it prevents seats from stepping outside the rails upon abusive use; it improves a fit between multiple independent floor panels; and it removes FOD intrusion in the locking pin or plunger under the crew floor.

Figure 1:
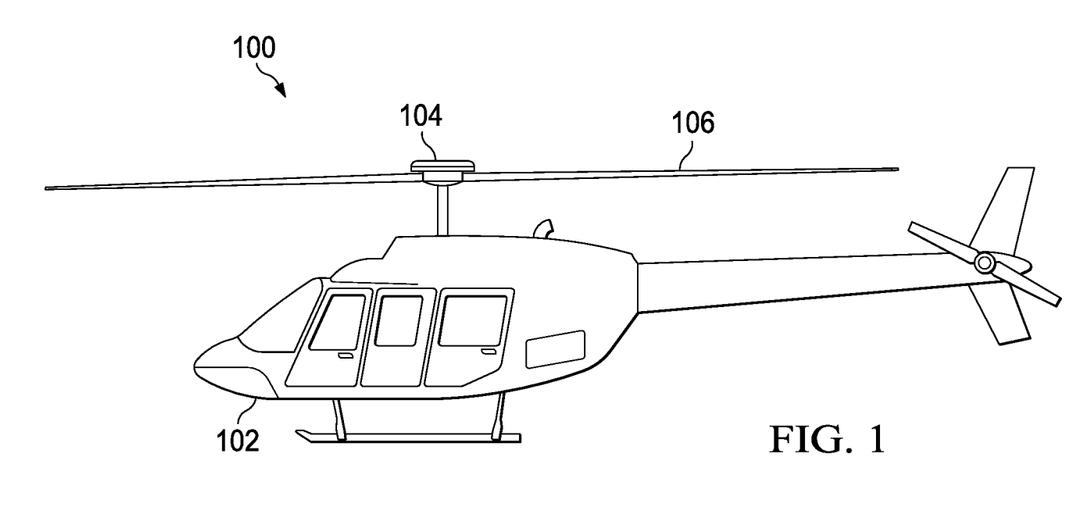
FIG. 1 shows a side view of a helicopter according to a preferred embodiment of the present application.

FIG. 1 depicts an aircraft 100 in accordance with one embodiment of the present application. In the exemplary embodiment, aircraft 100 is a helicopter having a fuselage 102 and a rotor system 104 carried thereon. A plurality of rotor blades 106 are operably associated with rotor system 104 for creating flight. The system of the present invention can be used in conjunction with an aircraft 100. Although shown associated with a helicopter, it will be appreciated that the system of the present application could also be utilized with different types of rotary aircraft and vehicles.

Figure 2A:
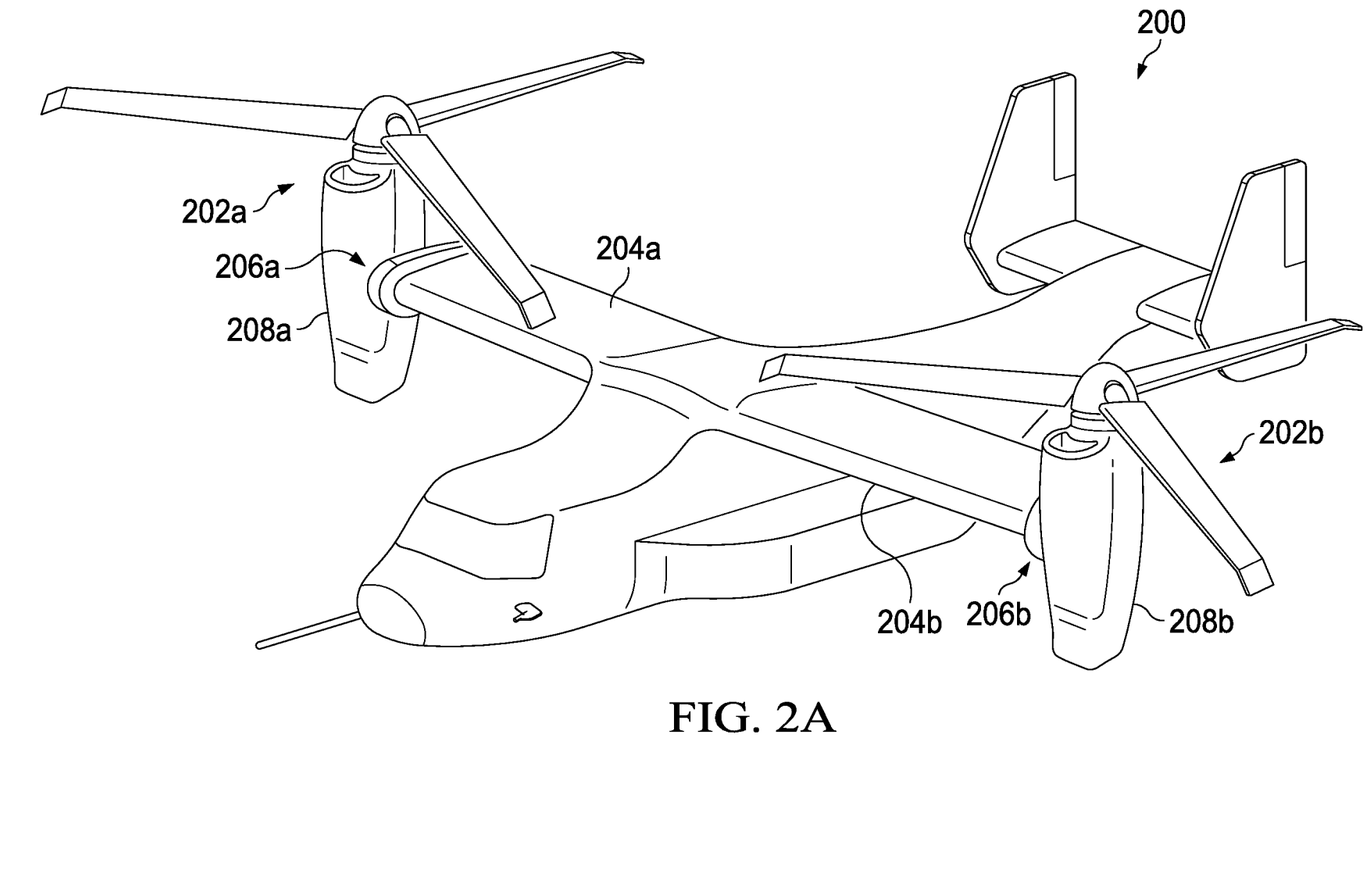
FIGS. 2A and 2B show a perspective view of tiltrotor aircraft according to an alternative embodiment of the present application.

For example, FIG. 2A illustrates a tiltrotor aircraft 200 that utilizes the system in accordance with the present application. Tiltrotor aircraft 200 includes rotor assemblies 202a and 202b that are carried by wings 204a and 204b, and are disposed at end portions 206a and 206b of wings 204a and 204b, respectively. Rotor assemblies 202a and 202b include nacelles 208a and 208b, which carry the engines and transmissions of tiltrotor aircraft 200. Rotor assemblies 202*a* and 202*b* move or rotate relative to wings 204*a* and 204*b* between a helicopter or hover mode in which nacelles 208*a* and 208*b* are tilted upward, such that tiltrotor aircraft 200 flies like a conventional helicopter; and an airplane or cruise mode in which rotor assemblies 202*a* and 202*b* are tilted forward, such that tiltrotor aircraft 200 flies like a conventional propeller driven aircraft.

Figure 2B:
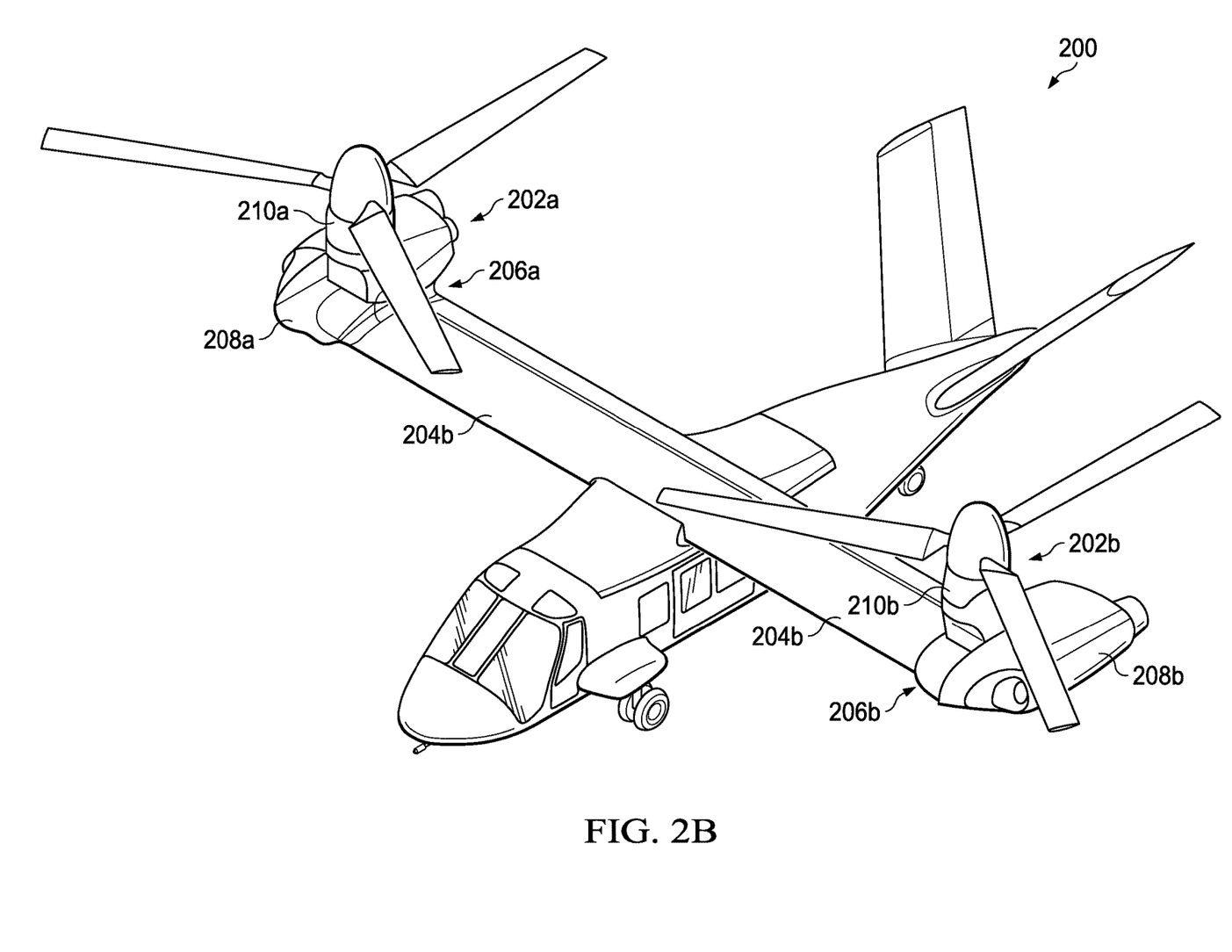
Figure 3:
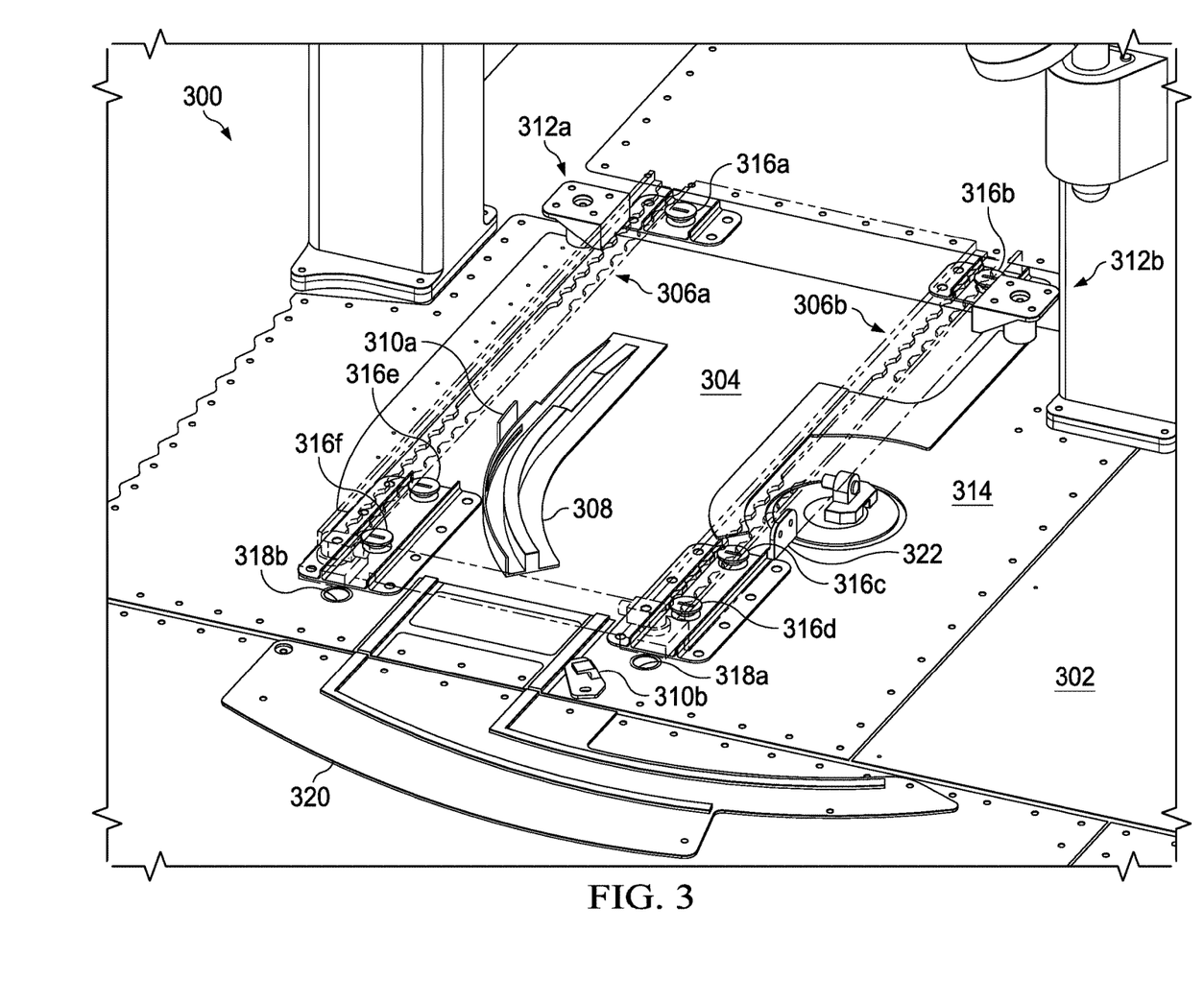
FIG. 3 shows a support structure for a seat assembly of the present invention.

FIG. 2B illustrates another tiltrotor aircraft 200 that utilizes the system in accordance with the present application. Tiltrotor aircraft 200 includes rotor assemblies 202*a* and 202*b* that are carried by wings 204*a* and 204*b*, and are disposed at end portions 206*a* and 206*b* of wings 204*a* and 204*b*, respectively. Rotor assemblies 202*a* and 202*b* include nacelles 208*a* and 208*b*, which include the engines and transmissions of tiltrotor aircraft 200. In this embodiment, the engines are fixed to the wing and do not rotate, rather, only the pylons 210*a* and 210*b* with the rotor assemblies 202*a* and 202*b* rotate. Pylons 210*a* and 210*b* move and rotate relative to wings 204*a* and 204*b* and the nacelles 208*a* and 208*b*. The nacelles 208*a* and 208*b* do not more relative to the wings 204*a* and 204*b*. Instead, during the transition between a helicopter or hover mode only the pylons 210*a* and 210*b* rotate to redirect the thrust from the rotor assemblies 202*a* and 202*b*. The tiltrotor aircraft 200 is still able to fly like a conventional helicopter; and an airplane or cruise mode in which on the rotors are tilted forward, such that tiltrotor aircraft 200 flies like a conventional propeller driven FIG. 3 shows a support structure 300 for a seat assembly of the present invention. Floor 302 of the passenger compartment is shown in relation to the support structure 300, which includes a platform 304 to which a seat (not depicted) is attached and that includes parallel seat adjustment tracks 306*a*, 306*b* that permit the user to move and lock the seat along the seat adjustment tracks 306*a*, 306*b* forward and rearward. Under the platform 304, a J-shaped track or channel 308 is depicted. The J-shaped track or channel 308 is connected to the platform 304 and has a first position generally toward the front of the vehicle in which the seat is an operational position. When the seat is pushed in a generally rearward direction, the platform 304 (and seat) travels rearward along the straight portion of the J-shaped track or channel 308, and then the platform 304 (and seat) pivots when the platform 304 reaches the curved portion of the J-shaped track or channel 308 toward a second or end position in which the platform 304 (and seat) is in an ingress/egress position. The support structure 300 can also include one or more strikers/catches 310*a* and 310*b*, which are positioned at the ingress/egress position of the platform 304 such that the strikers/catches 310*a* and 310*b* stabilize the platform 304 (and seat) in the ingress/egress position, but also help prevent wear on rollers by providing a releasable catch (strikers/catches 310*a* and 310*b*) when the seat is in the ingress/egress position that prevents unnecessary movement of the platform 304 (and seat). Also depicted are a pair of glide and wear plates 312*a*, 312*b* attached to the seat assembly substructure 314 and under the platform 304 (and seat). Seat track retainers and rails 316*a*-316*f* are depicted that have increased chamfer and clearance, and provide smooth docking in the forward position. Openings 318*a*, 318*b* in the seat assembly substructure 314 are connected by a conduit (not depicted) under the surface of the seat assembly substructure 314 for the retaining pins (not depicted) that will lock the seat in the forward/operational position. The conduit (not depicted) links both openings 318*a*, 318*b* and catches any foreign-object-debris (FOD) going through the openings 318*a*, 318*b*, allow the plunger/ pin operation even if FOD is present, and allow easy cleaning. Rearward from the seat assembly substructure 314 is an extended scuff plate 320 that includes modified rails. The extended scuff plate 320 protects, e.g., composite floor panels, and in conjunction with the seat assembly substructure 314, allows for easy screw-on installation of the support structure 300 (e.g., when provided in the form of a kit), which may be used to replace an existing assembly or for new installations. Finally, a bumper 322 is depicted adjacent the platform 304 that prevent derailments from the J-track at critical transition point (between lateral and forward and aft motion).

Figure 4A:
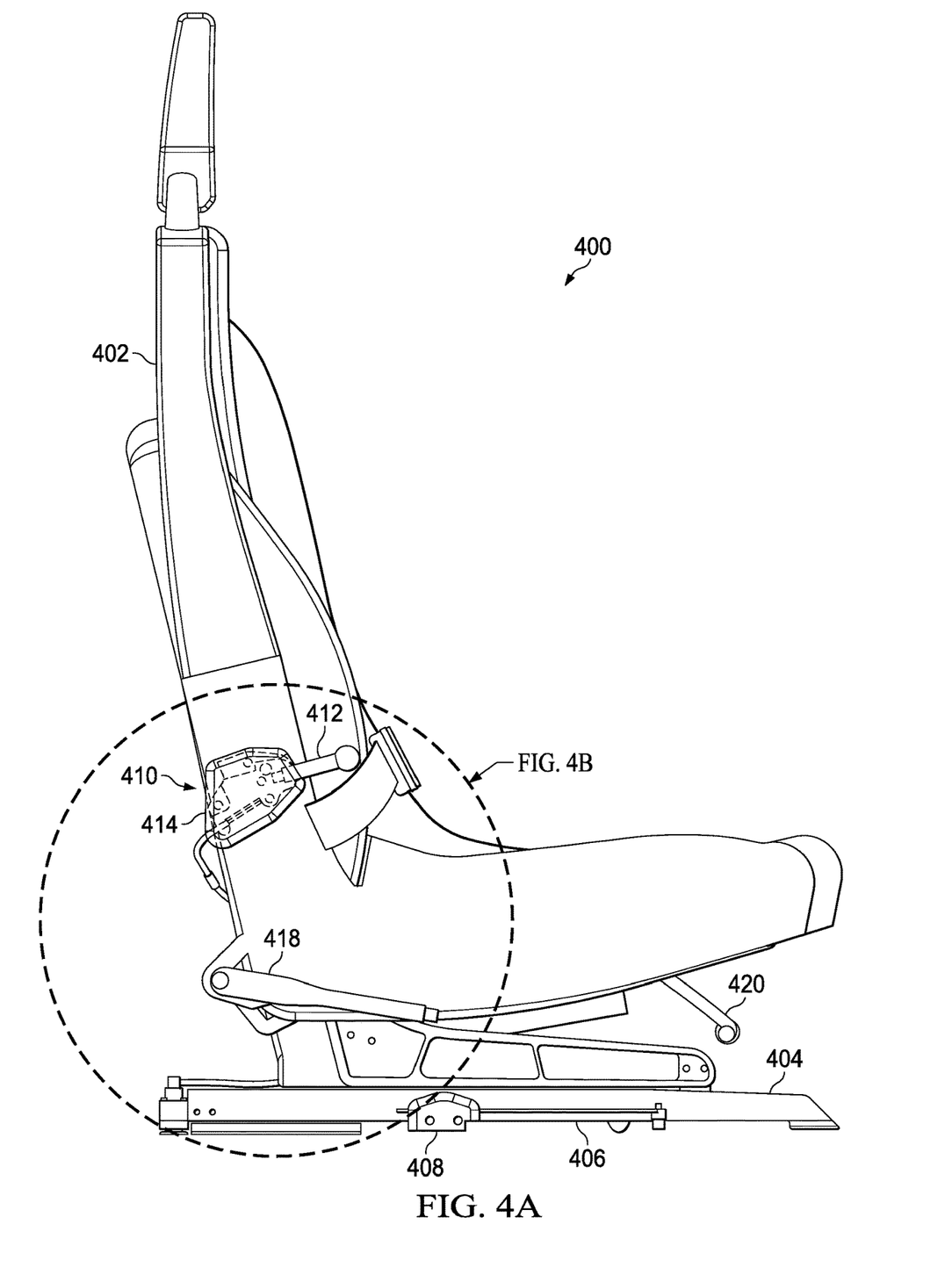
FIG. 4A shows a side view of a seat assembly of the present invention.
Figure 4B:
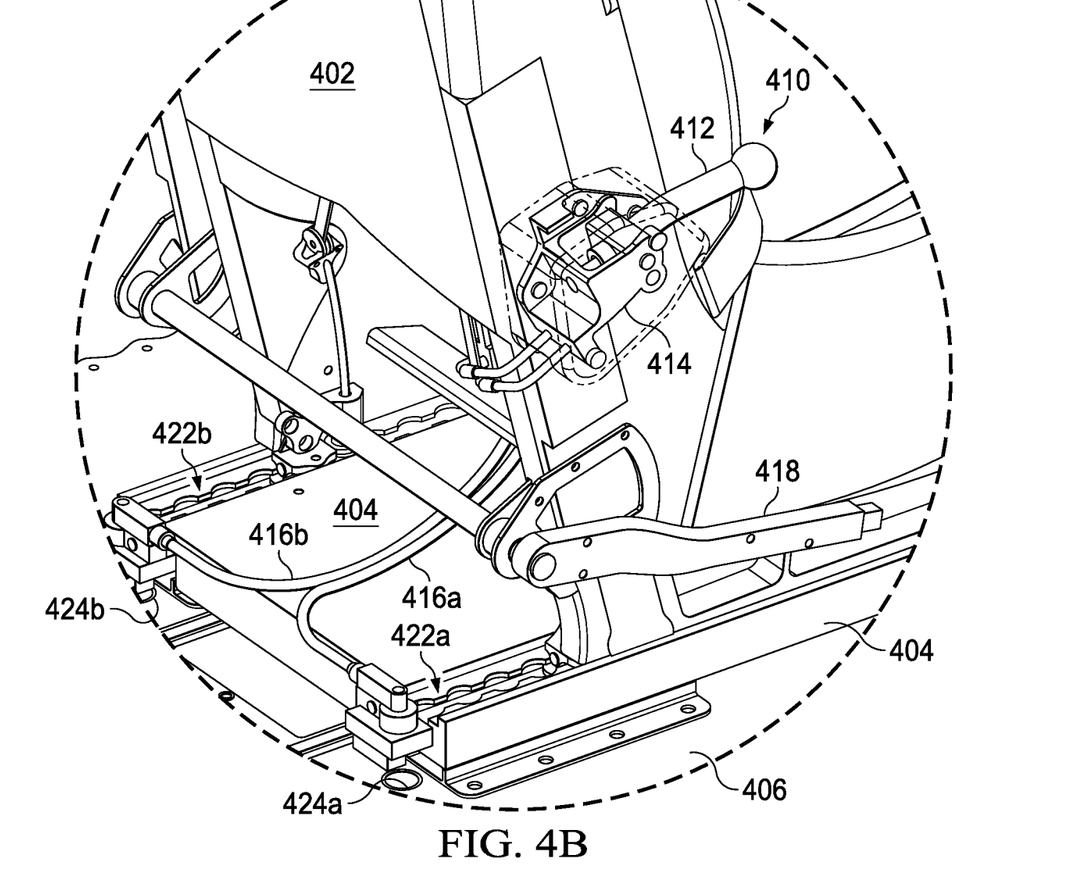
FIG. 4B is an isometric close-up view of the seat assembly of FIG. 4A.

FIG. 4A shows a side view of a seat assembly 400 that includes seat 402, platform 404, seat assembly substructure 406, bumper 408, and release handle assembly 410. FIG. 4B is an isometric close-up view of the seat assembly 400 of FIG. 4A. Release handle assembly 410 is depicted with a handle 412 and a release/locking mechanism 414 and a forward/rearward seat adjustment handle 420. The release/locking mechanism 414 is shown with two cables 416*a*, 416*b* that extend to the locking pins (not depicted) that are inserted into openings 424*a*, 424*b* in the seat assembly substructure 406 to lock the seat 402 into place at the forward/operational position. However, a single cable may be used that controls two or more locking pins or plungers. Both FIGS. 4A and 4B, shows height adjustment handle 418, forward/rearward seat adjustment handle 420, and the tracks 422*a*, 422*b*, for adjusting the height and the forward/rearward position of the seat 402, respectively.

Figure 5:
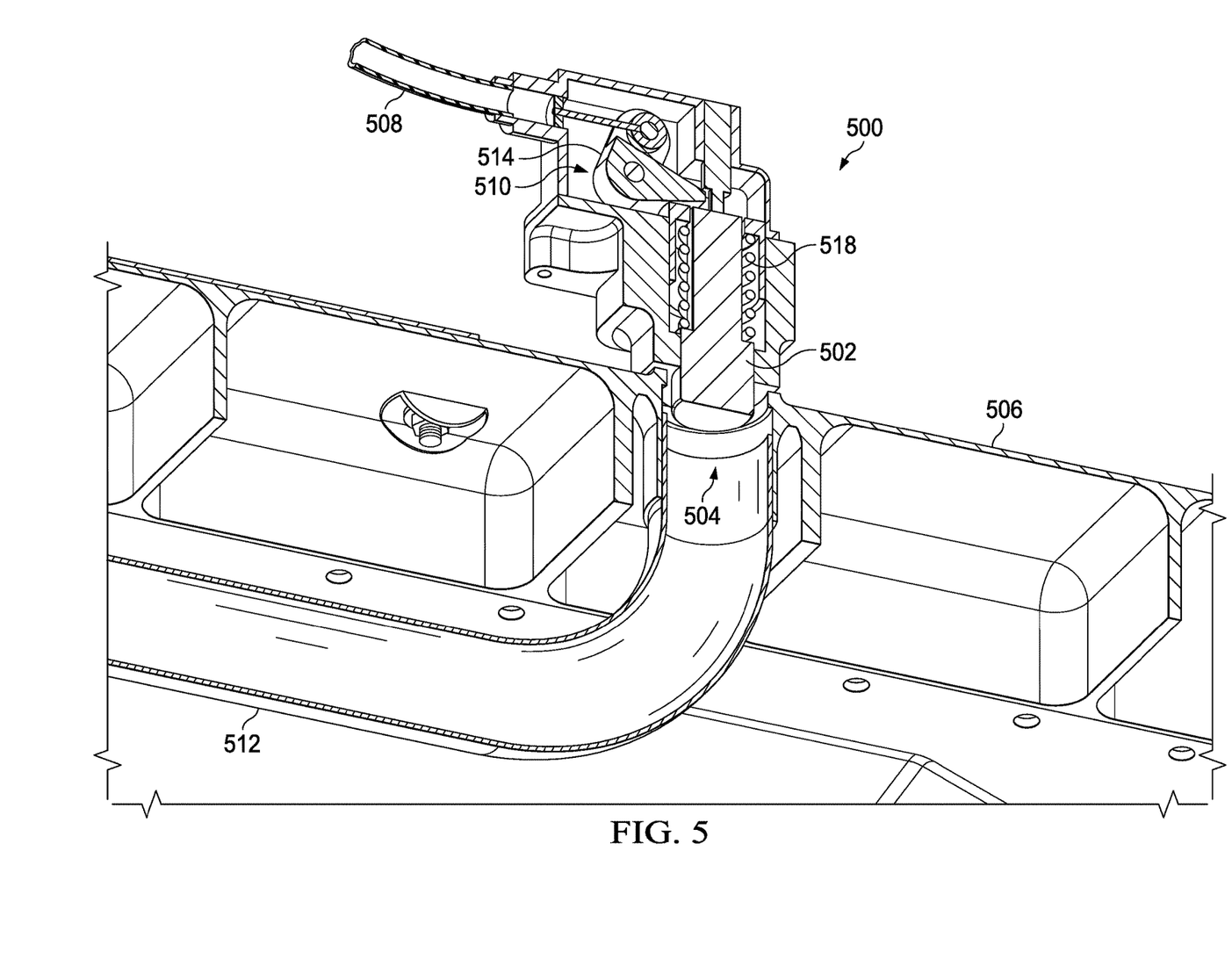
FIG. 5 shows a close up view of the locking/release mechanism of the present invention.
Figure 6:
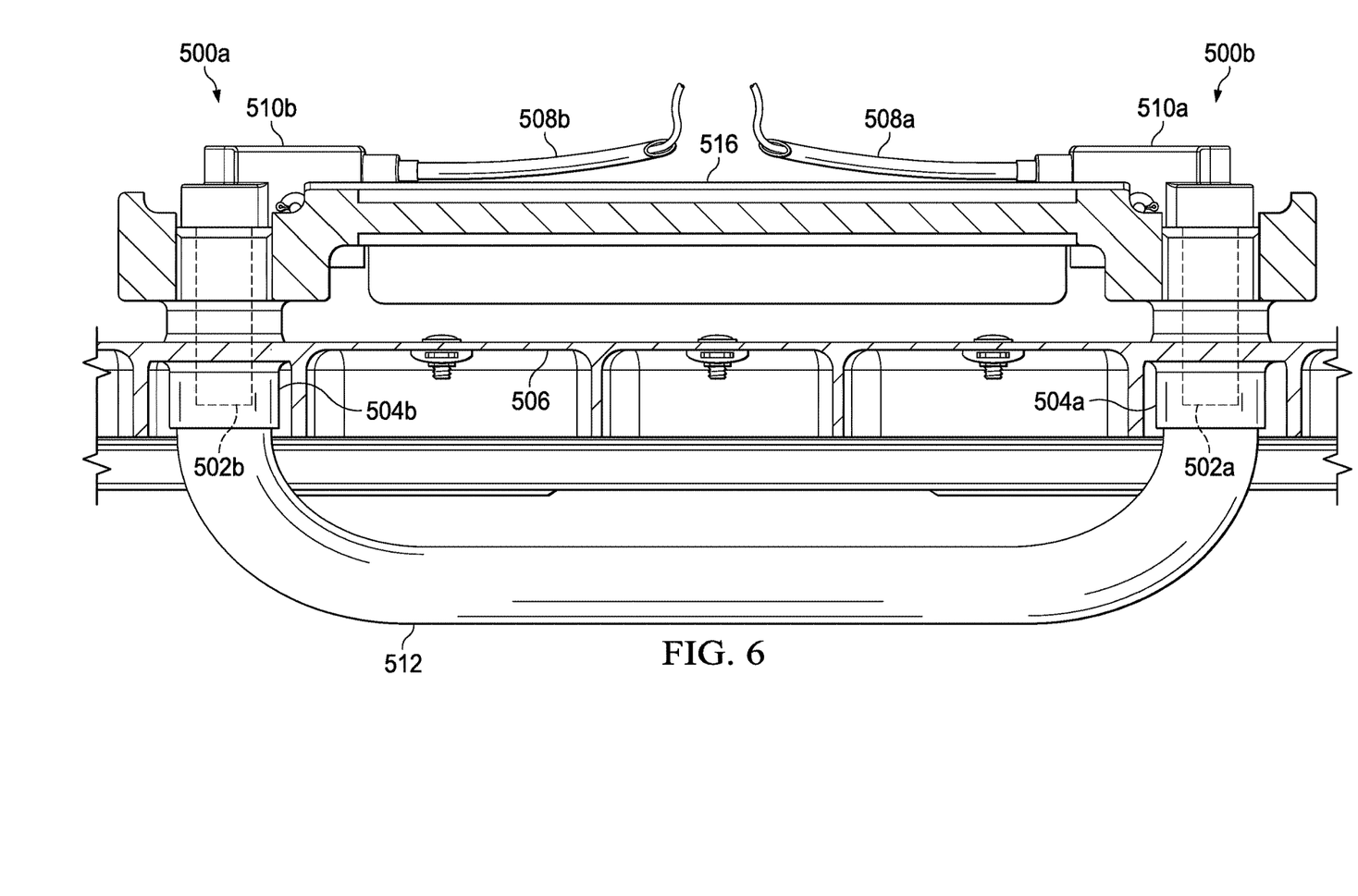
FIG. 6 shows a side view of a pair of locking/release mechanisms of the present invention in operation.

FIG. 5 shows a close up, partial cross-sectional view of the locking/release mechanism 500 of the present invention. The locking/release mechanism 500 is depicted such that the position of the locking pin 502 (positioned above the opening 504 of the seat assembly substructure 506) is controlled by cable 508 via locking/release mechanism 510. A conduit 512, which is below the surface of the seat assembly substructure 506, is designed to capture any FOD going in or around through the opening 504 which allows operation of the locking pin 502 even if FOD is present, and allows easy cleaning. The conduit 512 connects two such locking/release mechanisms 500, as shown in FIG. 6. A spring 518 is used to bias the locking pin 502 into the opening 504, which can be locked into the open position via lock 514. An indicia (such as a notch, one or more colors, etc.) can be etched, formed, painted or otherwise provided on the locking pin 502 or elsewhere in locking/release mechanism 500 to provide the use a visual indicator that the locking pin 502 is in, out, or both in and out of the opening 504.

FIG. 6 shows a side, partial cross-sectional view of the locking/release mechanisms 500*a*, 500*b* of the present invention. The locking/release mechanisms 500*a*, 500*b* are depicted as an isometric, cross-sectional view that shows the locking pins 502*a*, 502*b* positioned above the openings 504*a*, 504*b* of the seat assembly substructure 506 that is connected to cables 508*a*, 508*b* that include locking/release mechanisms 510*a*, 510*b* on platform 516. The conduit 512, which is below the surface of the seat assembly substructure 506, is designed to capture any FOD going through the openings 504*a*, 504*b*, which allow the operation of the locking pins 502*a*, 502*b* even if FOD is present, and allow easy cleaning of the FOD. The conduit 512 connects two such locking/release mechanisms 500*a*, 500*b* and permits the accumulation of FOB between cleanings.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15% from the stated value.

All of the methods disclosed and claimed herein can be made and executed without undue experimentation in light of the present disclosure. While the methods of this invention have been described in terms of preferred embodiments, it will be apparent to those of skill in the art that variations may be applied to the methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A moveable seat assembly comprising:
    first and second predetermined paths located on a floor of a vehicle, the first predetermined path having an operational location at a first end and the second predetermined path having an ingress/egress location at a second end, the first predetermined path having a substantially straight portion and the second predetermined path having a substantially curved portion;
    a seat slidably connected to the first and second predetermined paths and capable of translation between the first and second end;
    two or more openings on the floor of the vehicle on or about the first and second predetermined paths that provide a locking position for the seat, wherein the two or more openings are connected via a closed tube below a surface of the floor; and
    at least one locking pin/plunger connected to the seat and capable of engaging the two or more openings to lock the seat in place at the first end, wherein the locking pin/plunger is selectively operated by a handle connected to the locking pin/plunger, wherein the handle is at a location selected from the group consisting of below the seat, adjacent the seat, above the seat, on a side of the seat, on a side of a seat back, on arm rests of the seat, and behind the seat.

2. The moveable seat assembly of claim 1, wherein the seat is coupled to the first and second predetermined paths by a plurality of couplers, free orientation type couplers, or limited rotation type couplers.

3. The moveable seat assembly of claim 1, further comprising a travel assistance mechanism to assist in translating the seat between the operational location and the ingress/egress location.

4. The moveable seat assembly of claim 1, wherein the locking pin/plunger is selected from the group consisting of: a mechanical mechanism, a spring-type mechanism, an electric mechanism, a hydraulic mechanism, a pneumatic mechanism, a magnetic mechanism, an electro-hydraulic mechanism, an electro-pneumatic mechanism, or an electromagnetic mechanism.

5. The moveable seat assembly of claim 1, further comprising a spring-loaded catch positioned to releasably restrain the seat at the ingress/egress location.

6. The moveable seat assembly of claim 1, further comprising two or more glides or wear plates that at least one of: support at least part of a weight of the seat to reduce wear on the first and second predetermined paths or add stability to the seat while traveling along the first and second predetermined path.

7. The moveable seat assembly of claim 1, further comprising one or more bumpers or catches attached to the floor that at least one of: prevent derailment of the seat on the first and second predetermined paths at a transition between the substantially straight portion and a curved portion, or an ingress/egress striker catch that stabilizes the seat at the ingress/egress location.

8. The moveable seat assembly of claim 1, further comprising a scuff plate that extends around at least one edge of the floor adjacent the seat to prevent damage to the floor during operation of the vehicle or during ingress/egress from the seat.

9. The moveable seat assembly of claim 1, wherein the conduit is removable.

10. The moveable seat assembly of claim 1, wherein the locking pin/plunger further comprises indicia that show if the locking pin/plunger is in a locked or an unlocked position.

11. The moveable seat assembly of claim 1, wherein the locking pin/plunger is spring-loaded, and the locking pin/plunger is operated with a Bowden cable or push-pull-rod.

12. A rotorcraft comprising a moveable seat assembly comprising:
an operator cabin having a floor; and
a mounting plate for a seat comprising:
first and second predetermined paths located on the floor of the rotorcraft, the first predetermined path having an operational location at a first end and the second predetermined path having an ingress/egress location at a second end, the first predetermined path having a substantially straight portion and the second predetermined path having a substantially curved portion;
the seat slidably connected to the first and second predetermined paths and capable of translation between a first and a second position;
two or more openings on the floor of the rotorcraft on or about the first and second predetermined paths that provide a locking position for the seat, wherein the two or more openings are connected via a closed tube below a surface of the floor; and
at least one locking pin/plunger connected to the seat and capable of engaging the two or more openings to lock the seat in place along the first and second predetermined paths, wherein the locking pin/plunger is selectively operated by a handle connected to the locking pin/plunger, wherein the handle is at a location selected from the group consisting of below the seat, adjacent the seat, above the seat, on a side of the seat, on a side of a seat back, on arm rests of the seat, and behind the seat.

13. The moveable seat assembly of claim 12, further comprising a travel assistance mechanism to assist in translating the seat between the operational location and the ingress/egress location.

14. The moveable seat assembly of claim 12, wherein the locking pin/plunger is selected from the group consisting of: a mechanical mechanism, a spring-type mechanism, an electric mechanism, a hydraulic mechanism, a pneumatic mechanism, a magnetic mechanism, an electro-hydraulic mechanism, an electro-pneumatic mechanism, or an electro-magnetic mechanism.

15. The moveable seat assembly of claim 12, further comprising a spring-loaded catch positioned to releasably restrain the seat at the ingress/egress location.

16. The moveable seat assembly of claim 12, further comprising two or more glides or wear plates that at least one of: support at least part of a weight of the seat to reduce wear on the first and second predetermined paths or add stability to the seat while traveling along the first and second predetermined path.

17. The moveable seat assembly of claim 12, further comprising one or more bumpers or catches attached to the floor that at least one of: prevent derailment of the seat on the first and second predetermined paths at a transition between the substantially straight portion and a curved portion, or an ingress/egress striker catch that stabilizes the seat at the ingress/egress location.

18. The moveable seat assembly of claim 12, further comprising a scuff plate that extends around at least one edge of the floor adjacent the seat to prevent damage to the floor during operation of the rotorcraft or during ingress/egress from the seat.

19. The moveable seat assembly of claim 12, wherein the conduit is removable.

20. The moveable seat assembly of claim 12, wherein the locking pin/plunger further comprises indicia that shows if the locking pin/plunger is in a locked or an unlocked position, wherein the locking pin/plunger.

21. The moveable seat assembly of claim 12, wherein the locking pin/plunger is spring-loaded, and the locking pin/plunger is operated with a Bowden cable or push-pull-rod.

22. A kit for a moveable seat assembly for a vehicle, comprising:
a mounting plate for a seat comprising:
first and second predetermined paths located on a floor of the vehicle, the first predetermined path having an operational location at a first end and the second predetermined path having an ingress/egress location at a second end, the first predetermined path having a substantially straight portion and the second predetermined path having a substantially curved portion;
two or more openings on the floor of the vehicle on or about the first and second predetermined paths that provide a locking position for the seat, wherein the two or more openings are connected via a closed tube below a surface of the floor; and
instructions for installation of the moveable seat assembly, wherein the locking pin/plunger is selectively operated by a handle connected to the locking pin/plunger, wherein the handle is at a location selected from the group consisting of below the seat, adjacent the seat, above the seat, on a side of the seat, on a side of a seat back, on arm rests of the seat, and behind the seat.

23. A method of providing an improved moveable seat assembly, comprising:
providing first and second predetermined paths located on a floor of a vehicle, the first predetermined path having an operational location at a first end and the second predetermined path having an ingress/egress location at a second end, the first predetermined path having a substantially straight portion and the second predetermined path having a substantially curved portion;
attaching a seat slidably to the first and second predetermined paths and capable of translation between a first and a second position;
providing two or more openings on the floor of the vehicle on or about the first and second predetermined paths that provide a locking position for the seat, wherein the two or more openings are connected via a closed tube conduit below a surface of the floor; and providing at least one locking pin/plunger connected to the seat and capable of engaging the two or more openings to lock the seat in place along the first and second predetermined paths, wherein the locking pin/plunger is selectively operated by a handle connected to the locking pin/plunger, wherein the handle is at a location selected from the group consisting of below the seat, adjacent the seat, above the seat, on a side of the seat, on a side of a seat back, on arm rests of the seat, and behind the seat.

* * * * *